US 6,775,429 B2

(12) United States Patent
Wang et al.

(10) Patent No.: US 6,775,429 B2
(45) Date of Patent: Aug. 10, 2004

(54) DYNAMIC GAIN EQUALIZATION SYSTEM DESIGN WITH ADAPTIVE SPECTRUM DECOMPOSITION METHODOLOGY

(75) Inventors: Gaofeng Wang, Sunnyvale, CA (US); Naiqian Han, Cupertino, CA (US); Liji Huang, San Jose, CA (US)

(73) Assignee: Intpax, Inc., Cupertino, CA (US)

( * ) Notice: Subject to any disclaimer, the term of this patent is extended or adjusted under 35 U.S.C. 154(b) by 226 days.

(21) Appl. No.: 10/177,505

(22) Filed: Jun. 19, 2002

(65) Prior Publication Data

US 2003/0156779 A1 Aug. 21, 2003

Related U.S. Application Data

(60) Provisional application No. 60/357,368, filed on Feb. 19, 2002, and provisional application No. 60/375,227, filed on Apr. 25, 2002.

(51) Int. Cl.[7] .................................................. G02B 6/26
(52) U.S. Cl. ....................................................... 385/15
(58) Field of Search .............. 385/15, 122; 359/341.41, 359/634

(56) References Cited

U.S. PATENT DOCUMENTS

| | | | | |
|---|---|---|---|---|
| 5,519,796 A | * | 5/1996 | Li et al. ....................... 385/24 |
| 6,480,329 B2 | * | 11/2002 | Sugaya et al. ......... 359/341.42 |
| 6,510,261 B2 | * | 1/2003 | Sorin et al. ................... 385/27 |
| 2003/0081892 A1 | * | 5/2003 | Ghera et al. .................... 385/27 |

FOREIGN PATENT DOCUMENTS

EP 0933888 A2 * 8/1999

* cited by examiner

Primary Examiner—Mark Tremblay
(74) Attorney, Agent, or Firm—Bo-In Lin

(57) ABSTRACT

The present invention discloses an optical gain equalization system for receiving and equalizing a multiple-channel input optical signal. The optical gain equalization system includes a cascaded array of tunable optical filters filtering the multiple-channel input optical signal and generating a plurality of sub-signals and a residual signal and each of the sub-signals transmitted over a mutually exclusive filter-specific spectrum-range while a combination of all the filter-specific spectrums dynamically covering the spectral portions of said multi-channel input optical signal where power equalizations are required, and all said filter-specific spectrums together with the residual signal spectrum substantially covering an entire spectral range of the multi-channel input optical signal. The gain equalization system further includes a corresponding array of variable optical attenuators (VOAs) each connected to one of a corresponding tunable optical filter for attenuating the sub-signal transmitted over the filter-specific spectrum range for generating an equalized sub-signal. And, the gain equalization system further includes a multiplexing means for receiving and multiplexing the equalized sub-signals generated by the array of variable optical attenuators (VOAs) and the residual signal for generating an equalized output optical signal.

22 Claims, 2 Drawing Sheets

DYNAMIC GAIN EQUALIZATION SYSTEM DESIGN WITH ADAPTIVE SPECTRUM DECOMPOSITION METHODOLOGY

This Application claims a priority date of Feb. 19, 2002 benefited from a previously filed Provisional Patent Application 60/357,368 filed on Feb. 19, 2002 and 60/375,227 on Apr. 25, 2002 by the Applicants of this Formal Patent Application.

BACKGROUND OF THE INVENTION

1. Field of the Invention

This invention relates generally to apparatuses and methods for configuring an optical signal transmission system. More particularly, this invention is related to a dynamic gain equalization device and method of configuring a dynamic gain equalization system in an optical communication network applying an adaptive spectrum decomposition technique.

2. Description of the Related Art

The wavelength division multiplexing (WDM) is an emerging technology that enables service providers to significantly increase transport capacity while leveraging existing fiber-optic equipment. Application of erbium-doped fiber amplifiers (EDFAs) to amplify the optical signals in an optical communication system is a key enabling technology for WDM communications. Signal amplification technologies provide the necessary gain to overcome fiber attenuation across all information channels. Due to non-periodic changes in the power of input channels caused by channel add-drop operations, network reconfiguration, fiber cuts, or packetized traffic, the gain excursion in an EDFA leads to the occurrence of wide time-variant swings in the output power and output optical signal-to-noise ratio (OSNR). Moreover, the gain of an EDFA is, in general, wavelength-dependent, which leads to different gains among WDM channels. Hence, signals traversing a cascade of several amplifiers will experience an increasing OSNR spread among channels. In order to tackle the degradation of OSNR, dynamic gain equalizers are required in next generation wide-band optical communication system.

Therefore, a need still exists in the art in the field of the optical signal transmission systems to provide a dynamic gain equalization devices and configuration to overcome such difficulties and limitations. It is desirable that such device and system configuration can achieve effective equalization with simple and conveniently controllable configuration such that signal equalization process can be accurately performed with simplified processes.

SUMMARY OF THE PRESENT INVENTION

Therefore, it is an object of the present invention to provide new and improved configuration and methods for configuring a dynamic gain equalization to minimize the wavelength dependent gain variations among different channels and to reduce the optical signal-to-noise spread over several channels such that the problems and difficulties as encountered in the prior art may be resolved.

Specifically, it is an object of this invention to provide optical gain equalization devices applying the techniques of adaptive spectrum decomposition. The optical signal to be equalized is first adaptively decomposed into a series of narrowly spectrum-banded sub-signals and a residual signal. The spectrums of these sub-signals are roughly mutually exclusive while in combination; these sub-signals dynamically cover the portions of the original signal spectrum where power equalizations are required. The combination of all the sub-signal spectrums plus the residual signal spectrum substantially covers the entire spectral range of the original optical signal. The adaptive spectrum decomposition is implemented with tunable filters arranged as a cascade array. In a preferred embodiment, the cascade array may be implemented with optical micro-electromechanical system (MEMS) filters or tunable arrayed-waveguide gratings (AWG) filters.

Another object of this invention is to use of tunable filters in place of fixed filters to adaptively carry out the spectrum decomposition thus requiring less number of filters and provide better scalability. Another object of this invention is to implement variable optical attenuator array manufactured with MEMS technology and controlled by a VOA array driver such that convenient and effective control can be accurately performed to generate equalized output signals.

Briefly, in a preferred embodiment, this invention discloses an optical gain equalization system for receiving and equalizing a multiple-channel input optical signal. The optical gain equalization system includes a cascaded array of tunable optical filters filtering the multiple-channel input optical signal and generating a plurality of sub-signals plus a residual signal and each of the sub-signals transmitted over a mutually exclusive filter-specific spectrum-range while a combination of all the filter-specific spectrums together with the residual signal spectrum substantially covering the entire spectral range of the multi-channel input optical signal. The gain equalization system further includes a corresponding array of variable optical attenuators (VOAs) each connected to one of a corresponding tunable optical filter for attenuating the sub-signal transmitted over the filter-specific spectrum range for generating an equalized sub-signal. And, the gain equalization system further includes a multiplexing means for receiving and multiplexing the equalized sub-signals generated by the array of variable optical attenuators (VOAs) and the residual signal for generating an equalized output optical signal.

This invention further discloses a method for receiving and equalizing a multiple-channel input optical signal. The method includes the steps of: A) dynamically analyzing the multi-channel input optical signal for generating a set of signal spectral data. B) employing the set of signal spectral data for adaptively decomposing the multi-channel input optical signal into decomposed sub-signals plus a residual signal. And, C) employing the set of signal spectral data for dynamically equalizing the sub-signals to generate equalized sub-signals. In a preferred embodiment, the method further includes a step of employing an automatic equalization system controller to receive and apply the set of signal spectral data to control the steps of adaptively decomposing the multi-channel input optical signal into decomposed sub-signals plus a residual signal and the step of dynamically equalizing the sub-signals to generate equalized sub-signals.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 1:
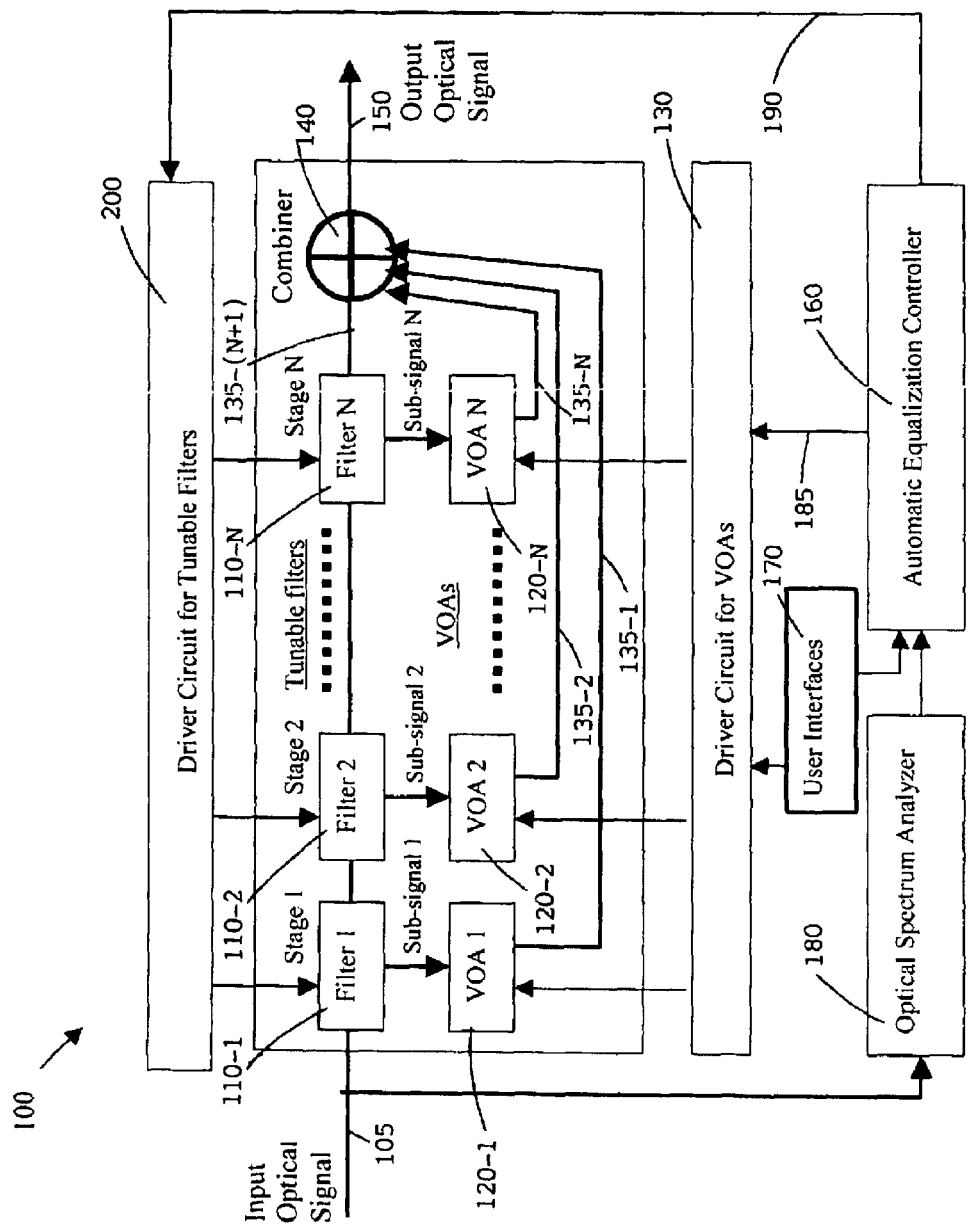
FIG. 1: is a schematic diagram for illustrating a robust, high-performance, dynamic gain equalizer applying the adaptive spectrum decomposition techniques of this invention.
Figure 2:
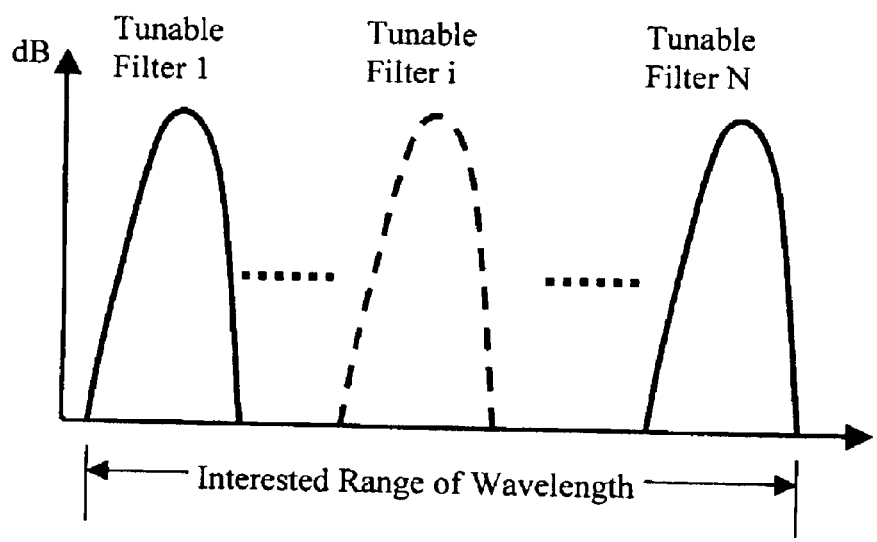
FIG. 2: is a waveform diagram of the transfer functions of tunable filters applied for carrying out an adaptive spectrum decomposition.

Referring to FIG. 1 for a functional block diagram that illustrates a dynamic gain equalization system 100 of this invention. The dynamic gain equalization system 100 includes a cascaded array of tunable optical filters 110-1, 110-2, . . . , 110-N for filtering and decomposing a multiplexed input signal received from an input port 105 into a series of non-overlapping decomposed signals each signal has a spectral range as that shown in FIG. 2. The tunable optical filters 110-1, 110-2, 110-3, . . . , 110-N generate output signals for transmitting to a corresponding variable optical attenuator 120-1, 120-2, . . . , 120-N controlled by a variable attenuator controller 130 for generating dynamically adaptive gain equalization signal 125 for each VOA 120-1, 120-2, . . . 120-N to generate equalized optical signals as that shown in FIG. 2. The equalized output signal 135-1, 135-2, . . . 135-N are shown in FIG. 2 are then transferred to a optical signal combiner, e.g. an optical multiplexing device 140, to combine the equalized signals and the residual signal 135-N+1 into an final equalized output signal 150.

The dynamic gain equalization system 100 is controlled by an automatic equalization controller 160 that receives data from a system operator through a user interface 170 and an optical spectrum analyzer that performs a spectrum analysis on the input optical signal 105. The automatic equalization controller 160 performs analyses of the spectrum data from the analyzer 180 to dynamically generate control signals 185 to the VOA controller 130 and control signals 190 to a driving circuit 200 for controlling the tunable filters 110-1, 110-2, . . . , 110-N. According to the data generated by the optical spectrum analyzer 180, the automatic equalization controller then dynamically generates signals for adjusting the tunable filters and the gain equalization signals to the VOA for adaptively adjusting the operation parameters of the gain equalization system to effectively generate equalized optical signal 150 in a dynamically adaptive manner.

By applying an adaptive spectrum decomposition technique, a robust, highly accurate and dynamically adjustable gain equalizer is disclosed in this invention. The adaptive spectrum decomposition is achieved by implementation of a cascaded array of tunable filters 110-1, 110-2, 110-3, . . . , 110-N and meanwhile adjusting the gain equalization signals by applying the automatic equalization controller 160 and the VOA controller 130 to generate VOA control signals to compensate the sub-signals generated from each of the tunable filers. A desirable power spectrum as that shown FIG. 2 is generated by the VOA array for combining into a final equalized output signal 150.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. An optical gain equalization system for receiving and equalizing a multiple-channel input optical signal comprising:

a cascaded array of tunable optical filters filtering said multiple-channel input optical signal and generating a plurality of sub-signals and a residual signal and each of said sub-signals transmitted over a mutually exclusive filter-specific spectrum-range while a combination of all said filter-specific spectrums dynamically covering the spectral portions of said multi-channel input optical signal for power equalizations with all said filter-specific spectrums together with a spectral range of said residual signal substantially covering the entire spectral range of said multi-channel input optical signal;

a corresponding array of variable optical attenuators (VOAs) each connected to one of a corresponding tunable optical filter for attenuating said sub-signal transmitted over said filter-specific spectrum range for generating an equalized sub-signal; and a multiplexing means for receiving and multiplexing said equalized sub-signals generated by said array of variable optical attenuators (VOAs) for generating an equalized output optical signal.

2. The optical gain equalization system of claim 1 further comprising:

a driver circuit for controlling said cascaded array of tunable optical filters for adaptively generating said plurality of sub-signals.

3. The optical gain equalization system of claim 1 further comprising:

a driver circuit for controlling said array of variable optical attenuators (VOAs) for adaptively attenuating each of said sub-signals received from said corresponding tunable optical filters.

4. The optical gain equalization system of claim 1 further comprising:

a driver circuit for controlling said cascaded array of tunable optical filters for adaptively generating said plurality of sub-signals;

a driver circuit for controlling said array of variable optical attenuators (VOAs) for adaptively attenuating each of said sub-signals received from said corresponding tunable optical filters; and an automatic equalization system controller for controlling said drive circuit for controlling said tunable optical filters and said driver circuit for controlling said VOAs for adaptively generating said equalized output optical signal.

5. The optical gain equalization system of claim 4 further comprising:

a user interface device for enabling a user to input user commands to said automatic equalization system controller.

6. The optical gain equalization system of claim 4 further comprising:

an optical spectrum analyzer for analyzing said multi-channel input optical signal for providing spectrum data to said automatic equalization system controller.

7. The optical gain equalization system of claim 1 wherein:

said cascaded tunable optical filters is an array of optical micro-electromechanical system (MEMS) filters.

8. The optical gain equalization system of claim 1 wherein:

said cascaded tunable optical filters is an arrayed-waveguide grating (AWG) filters.

9. An optical gain equalization system for receiving and equalizing a multiple-channel input optical signal comprising:

a spectrum analyzing means for dynamically analyzing said multi-channel input optical signal for generating a set of signal spectral data;

an adaptive signal decomposing means for employing said set of signal spectral data for adaptively decomposing said multi-channel input optical signal into decomposed sub-signals and a residual signal; and an adaptive equalization means for employing said set of signal spectral data for dynamically equalizing said sub-signals to generate equalized sub-signals.

10. The optical gain equalization system of claim 9 further comprising:

an automatic equalization system controller receiving and applying said set of signal spectral data to control said adaptive signal decomposing means and said adaptive equalization means.

11. The optical gain equalization system of claim 9 further comprising:

a multiplexing means for multiplexing said sub-signals and said residual signal for generating an equalized output signal.

12. A method for receiving and equalizing a multiple-channel input optical signal comprising:

dynamically analyzing said multi-channel input optical signal for generating a set of signal spectral data;

employing said set of signal spectral data for adaptively decomposing said multi-channel input optical signal into decomposed sub-signals and a residual signal; and employing said set of signal spectral data for dynamically equalizing said sub-signals to generate equalized sub-signals.

13. The method claim 12 further comprising:

employing an automatic equalization system controller to receive and apply said set of signal spectral data to control said steps of adaptively decomposing said multi-channel input optical signal into decomposed sub-signals and a residual signal and said step of dynamically equalizing said sub-signals to generate equalized sub-signals.

14. The method of claim 9 further comprising:

multiplexing said sub-signals for generating an equalized output signal.

15. A method for receiving and equalizing a multi-channel input optical signal comprising:

receiving said multi-channel input optical signal into a cascaded array of tunable optical filters for filtering and generating a plurality of sub-signals and a residual signal and each of said sub-signals transmitted over a mutually exclusive filter-specific spectrum-range while a combination of all said filter-specific spectrums dynamically covering a spectral portion of said multi-channel input optical signal for power equalization with all of said filter-specific spectrums together with a spectral range of said residual signal substantially covering an entire spectral range of said multi-channel input optical signal;

receiving each of said sub-signals into a corresponding array of variable optical attenuators (VOAs) for attenuating said sub-signal transmitted over said filter-specific spectrum range for generating an equalized sub-signal; and receiving said sub-signals into a multiplexing means for multiplexing said equalized sub-signals generated by said array of variable optical attenuators (VOAs) for generating an equalized output optical signal.

16. The method of claim 15 further comprising:

employing a driver circuit for controlling said cascaded array of tunable optical filters for adaptively generating said plurality of sub-signals.

17. The method of claim 15 further comprising:

employing a driver circuit for controlling said array of variable optical attenuators (VOAs) for adaptively attenuating each of said sub-signals received from said corresponding tunable optical filters.

18. The method of claim 15 further comprising:

employing a driver circuit for controlling said cascaded array of tunable optical filters for adaptively generating said plurality of sub-signals;

employing a driver circuit for controlling said array of variable optical attenuators (VOAs) for adaptively attenuating each of said sub-signals received from said corresponding tunable optical filters; and employing an automatic equalization system controller for controlling said drive circuit for controlling said tunable optical filters and said driver circuit for controlling said VOAs for adaptively generating said equalized output optical signal.

19. The method of claim 18 further comprising:

employing a user interface device for enabling a user to input user commands to said automatic equalization system controller.

20. The method of claim 18 further comprising:

employing a optical spectrum analyzer for analyzing said multi-channel input optical signal for providing spectrum data to said automatic equalization system controller.

21. The method of claim 15 wherein:

said step of receiving said multi-channel input optical signal into a cascaded array of tunable optical filters is a step of receiving said input optical signal into an array of optical micro-electromechanical system (MEMS) filters.

22. The method of claim 15 wherein:

said step of receiving said multi-channel input optical signal into a cascaded array of tunable optical filters is a step of receiving said input optical signal into an arrayed-waveguide grating (AWG) filters.

* * * * *